United States Patent [19]

Matsumoto

[11] Patent Number: 4,799,002

[45] Date of Patent: Jan. 17, 1989

[54] METHOD OF DRIVING A FIVE-PHASE STEPPING MOTOR

[75] Inventor: Kenji Matsumoto, Kashiwa, Japan

[73] Assignee: Oriental Motor Co, Ltd., Tokyo, Japan

[21] Appl. No.: 50,937

[22] Filed: May 15, 1987

[30] Foreign Application Priority Data

May 20, 1986 [JP] Japan .............................. 61-76152[U]

[51] Int. Cl.$^4$ .............................................. H02P 8/00
[52] U.S. Cl. ..................................... 318/696; 318/685
[58] Field of Search ................................. 318/696, 685

[56] References Cited

U.S. PATENT DOCUMENTS

| | | | |
|---|---|---|---|
| 3,866,104 | 2/1975 | Heine | 318/696 |
| 4,000,452 | 12/1976 | Heine | 318/696 |
| 4,095,161 | 6/1978 | Heine et al. | 318/696 |
| 4,412,166 | 10/1987 | Crider et al. | 318/696 |
| 4,663,577 | 5/1987 | Satomi | 318/696 |

Primary Examiner—Willaim M. Shoop, Jr.
Assistant Examiner—Saul M. Bergmann
Attorney, Agent, or Firm—Stanger, Michaelson, Reynolds, Spivak & Tobia

[57] ABSTRACT

A five-phase stepping motor system includes phase windings connected in series with each other to form a ring and pairs of switching devices connected in series with each other, with each pair having an intermediate connection connected to a corresponding junction between the phase windings. One switching device of each pair is connected to a positive pole of a d.c. power source and the other switching device is connected to a negative pole of the power source. The switching devices are turned on and off to connect two junctions to the positive pole of the power source and to connect two junctions to the negative poles of the power source. The switching devices in the remaining pair isolate the remaining junction from the power source. Exciting signals are applied to the switching devices so that the junction in the opened state is shifted to other junctions every pulse.

6 Claims, 4 Drawing Sheets

METHOD OF DRIVING A FIVE-PHASE STEPPING MOTOR

BACKGROUND OF THE INVENTION i. FIELD OF THE INVENTION

The present invention relates to five-phase stepping motor systems ad particularly to methods and means for driving five phase stepping motors.

ii. DESCRIPTION OF THE PRIOR ART

Driving a stepping motor involves using a full step drive which effects angular movement over a predetermined angle, that is a step angle, in response to every pulse supplied to a drive circuit, and a half step drive which effects angular movement over half of the predetermined angle every pulse.

A drive circuit used in the full step drive of the five-phase stepping motor includes a drive circuit of a so-called pentagonal drive type including phase windings connected to each other to form a ring.

The drive circuit energizes phase windings connected in series with each other to form a ring, and includes pairs of transistors connected in series to each other with each pair having a connection connected to a corresponding junction between the phase windings. One transistor of each pair is connected to the positive pole of a d.c. power source and the other transistor of each pair is connected to the negative pole of the power source.

Prior drive circuits and phase windings of this type appear in FIGS. 4(a) and 4(b). Here the drive circuit performs a full step drive by turning on and off ten transistors $T_1, \ldots,$

TABLE 1

| STEP | 1 | 2 | 3 | 4 | 5 | 6 | 7 | 8 | 9 | 10 |
|---|---|---|---|---|---|---|---|---|---|---|
| $T_1$ | O | | | | | | O | O | O | O |
| $T_6$ | | O | O | O | O | O | | | | |
| $T_7$ | O | O | | | | | | O | O | O |
| $T_2$ | | | O | O | O | O | O | | | |
| $T_3$ | O | O | O | | | | | | O | O |
| $T_8$ | | | | O | O | O | O | O | | |
| $T_9$ | O | O | O | O | | | | | | O |
| $T_4$ | | | | | O | O | O | O | O | |
| $T_5$ | O | O | O | O | O | | | | | |
| $T_{10}$ | | | | | | O | O | O | O | O |

For example, in step 1, since transistors $T_1$, $T_3$, $T_5$, $T_7$, and $T_9$ are turned on, currents shown by arrows of FIG. 4(a) flow through the phase windings. Further, in step 2, currents shown by arrows of FIG. 4(b) flow through four phase windings and effect a four-phase excitation.

In such a conventional drive, one of the pair of transistors for connecting the windings to the positive or negative pole of the power source is always on.

Accordingly, when the on and off state of the pair is reversed, a very large short-circuit current flows through a transistor pair from the positive pole of the power source to its negative pole due to delay of the off time of the transistor, and the pair of transistors generate heat. Thus, in order to prevent this problem, a delay circuit for the delaying turning on of the transistor has been required.

SUMMARY OF THE INVENTION

It is an object of the present invention to avoid the above problem and provide a stepping motor drive and system which assures the existence of the non-conductive state in the transistor at each step in the course of operation of switching means to prevent generation of heat in the switching means.

In order to achieve the above object, in the present invention, phase windings of the five-phase stepping motor are connected in series to each other to form a ring. Each of the junctions between each pair of switching means is connected in series to each other. One of the pair of switching means is connected to the positive pole of a d.c. power source and the other of the pair of switching means is connected to the negative pole of the d.c. power source. Two of the junctions are connected to the positive pole of the power source through the switching means and two others of the junctions are connected to the negative pole of the power source. Remaining junctions are not connected to the power source and are in an opened state. The open junctions are shifted to other junctions every pulse.

Further, in the present invention, when the phase windings of the five-phase stepping motor are $\phi 1$ to $\phi 5$, a terminating end of the phase winding $\phi 1$ and a terminating end of the phase winding $\phi 2$, a starting end of the phase winding $\phi 2$ and a terminating end of the phase winding $\phi 3$, a terminating end of the phase winding $\phi 3$ and a terminating end of the phase winding $\phi 4$, a starting end of the phase winding $\phi 4$ and a starting end of the phase winding $\phi 5$, and a terminating end of the phase winding $\phi 5$ and a starting end of the phase winding $\phi 1$ are connected to each other, respectively. A junction 1 between the phase windings $\phi 1$ and $\phi 5$ is connected to a connection a1 between switching means $T_1$ and $T_6$ connected in series to each other, a junction 2 between the phase windings $\phi 1$ and $\phi 2$ is connected to a connection a2 between switching means $T_2$ and $T_7$ connected in series to each other, a junction 3 between the phase windings $\phi 2$ and $\phi 3$ is connected to a connection a3 between switching means $T_3$ and $T_8$ connected in series to each other, a junction 4 between the phase windings $\phi 3$ and $\phi 4$ is connected to a connection a4 between switching means $T_4$ and $T_9$ connected in series to each other, and a junction 5 between the phase windings $\phi 4$ and $\phi 5$ is connected to a connection a5 between switching means $T_5$ and $T_{10}$ connected in series to each other. The switching means $T_1$ to $T_5$ are connected to a positive pole of the power source and the switching means $T_6$ to $T_{10}$ are connected to the negative pole of the power source. The switching means $T_3$, $T_5$, $T_7$ and $T_9$ are operated in step 1, the switching means $T_3$, $T_5$, $T_6$ and $T_9$ are operated in step 2, the switching means $T_2$, $T_3$, $T_6$ and $T_9$ are operated in step 3, the switching means $T_2$, $T_5$, $T_6$ and $T_8$ are operated in step 4, the switching means $T_2$, $T_4$, $T_6$ and $T_8$ are operated in step 5, the switching means $T_2$, $T_4$, $T_8$ and $T_{10}$ are operated in step 6, the switching means $T_1$, $T_4$, $T_8$ and $T_{10}$ are operated in step 7, the switching means $T_1$, $T_4$, $T_7$ and $T_{10}$ are operated in step 8, the switching means $T_1$, $T_3$, $T_7$ and $T_{10}$ are operated in step 9, and the switching means $T_1$, $T_3$, $T_7$ and $T_{10}$ are operated in step 10 so that the phase windings are excited. The above operation is repeated so that the junctions in the opened state from the power source are shifted to other junctions.

According to the present invention as configured above, there exists a state in which both switching means connected in series to each other are off, so as to prevent a short-circuit current to reduce generation of heat in the switching means.

DESCRIPTION OF THE PREFERRED EMBODIMENTS

The present invention is now described in detail with reference to an embodiment shown in the figures.

Figure 1:
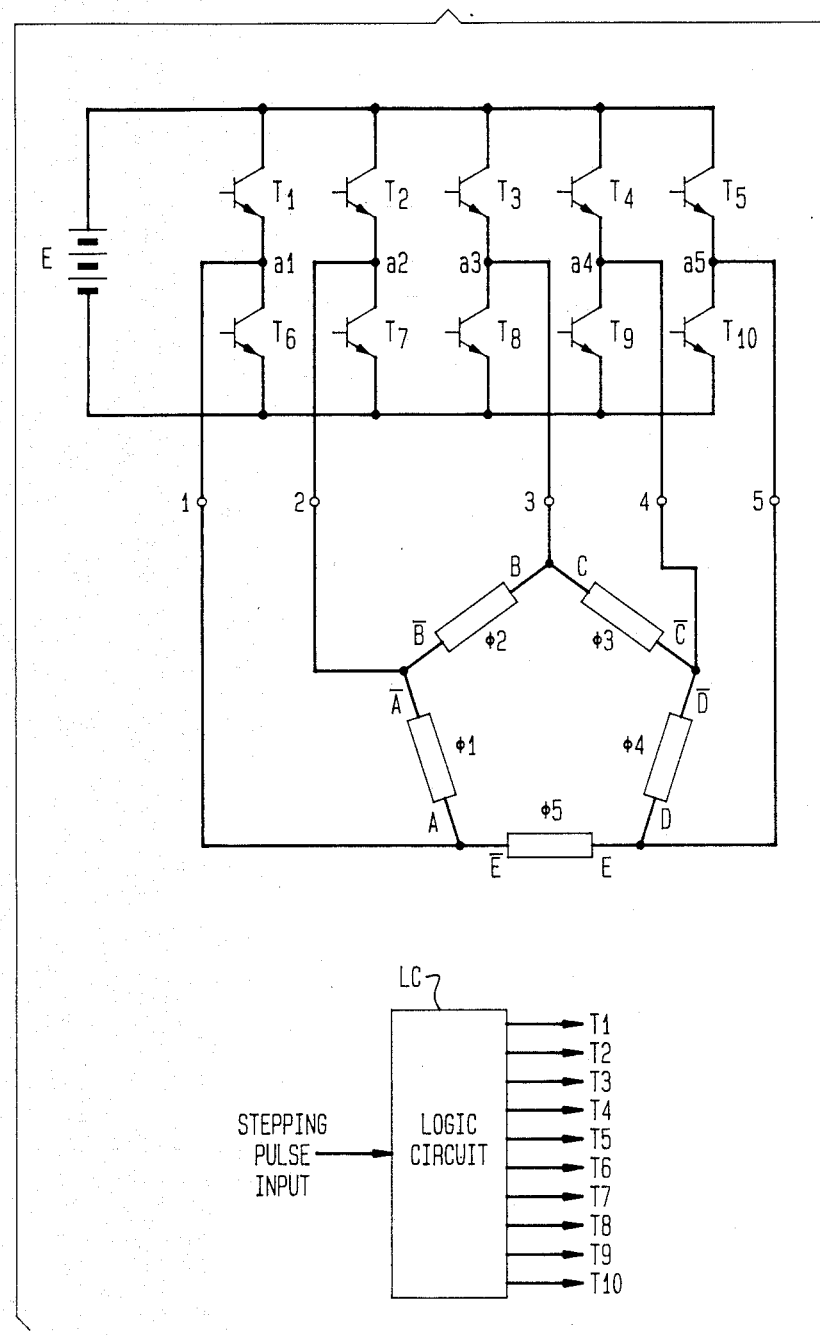
FIG. 1 is a circuit diagram showing a five-phase stepping motor system embodying the present invention.

In FIG. 1, $\phi 1$ to $\phi 5$ represent phase windings of a five-phase stepping motor. The phase windings $\phi 1$ to $\phi 5$ are connected in series to each other by connecting starting ends of the phase windings to terminating ends of adjacent phase windings to form a ring so that torque vectors A, B, C, D and E (or $\overline{A}$, $\overline{B}$, $\overline{C}$, $\overline{D}$ and $\overline{E}$) electrically shifted 36° relative to each other are produced when currents flow through the phase windings $\phi 1$ to $\phi 5$ in the direction from n to $\overline{n}$ (or from $\overline{n}$ to n).

More particularly, a terminating end of the phase winding $\phi 1$ and a terminating end of the phase winding $\phi 2$, a starting end of the phase winding $\phi 2$ and a starting end of the phase winding $\phi 3$, a terminating end of the phase winding $\phi 3$ and a terminating end of the phase winding $\phi 4$, a starting end of the phase winding $\phi 4$ and a starting end of the phase winding $\phi 5$, and a terminating end of the phase winding $\phi 5$ and a starting end of the phase winding $\phi 1$ are connected to each other, respectively. In the above description, n represents A, B, C, D and E. Transistors $T_1$ to $T_5$ form switching means and connected to the positive pole of a d.c. power source E and transistors $T_6$ to $T_{10}$ form switching means and connected to the negative pole of the power source E are connected to junctions 1 to 5 between the phase windings $\phi 1$ to $\phi 5$, respectively.

The junction between the phase windings $\phi 1$ and $\phi 5$ is connected to a connection a1 between switching means $T_1$ and $T_6$ connected in series to each other, the junction 2 between the phase windings $\phi 1$ and $\phi 2$ is connected to a connection a2 between switching means $T_2$ and $T_7$ connected in series to each other, the junction 2 between the phase windings $\phi 2$ and $\phi 3$ is connected to a connection a3 between switching means $T_3$ and $T_8$ connected in series to each other, the junction 4 between the phase windings $\phi 3$ and $\phi 4$ is connected to a connection a4 between switching means $T_4$ and $T_9$ connected in series to each other, and the junction 5 between the phase windings $\phi 4$ and $\phi 5$ is connected to a connection a5 between switching means $T_5$ and $T_{10}$ connected in series to each other. The switching means $T_1$ to $T_5$ are connected to the positive pole of the power source and the switching means $T_6$ to $T_{10}$ are connected to the negative pole of the power source.

An exciting or logic circuit LC turns on the transistors $T_1$ to $T_{10}$ in accordance with a sequence shown in Table 2, in which transistors marked with "O" are turned on.

TABLE 2

| STEP | 1 | 2 | 3 | 4 | 5 | 6 | 7 | 8 | 9 | 10 |
|---|---|---|---|---|---|---|---|---|---|---|
| $T_1$ |   |   |   |   |   |   | O | O | O | O |
| $T_6$ |   | O | O | O | O |   |   |   |   |   |
| $T_7$ | O |   |   |   |   |   |   | O | O | O |
| $T_2$ |   |   | O | O | O | O |   |   |   |   |
| $T_3$ | O | O |   |   |   |   |   |   | O | O |
| $T_8$ |   |   |   | O | O | O | O |   |   |   |
| $T_9$ | O | O | O |   |   |   |   |   |   | O |
| $T_4$ |   |   |   |   | O | O | O | O |   |   |
| $T_5$ | O | O | O | O |   |   |   |   |   |   |
| $T_{10}$ |   |   |   |   |   | O | O | O | O |   |

The five-phase stepping motor operates as follows in accordance with a time chart shown in Table 2.

Figure 2A:
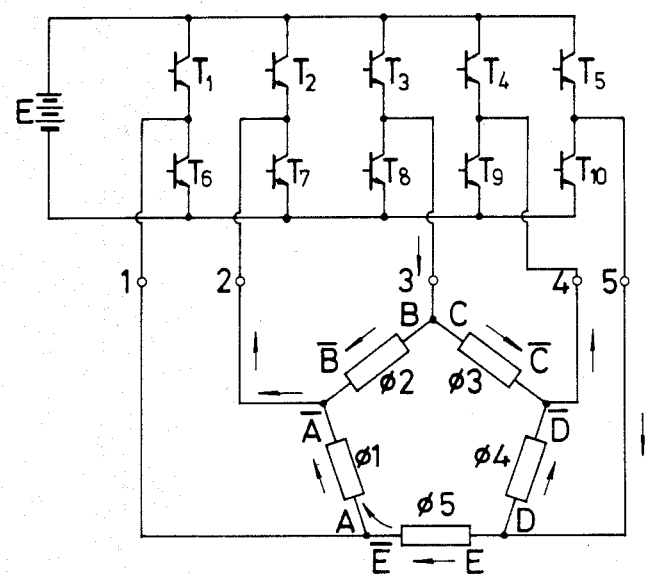
FIGS. 2(a), 2(b) and 2(c) circuit diagrams showing currents flowing through phase windings in the circuit of FIG. 1 during steps 1 to 3, respectively.

In step 1, the transistors $T_3$, $T_5$, $T_7$ and $T_9$ are conductive so that the junction 3 between the phase windings $\phi 1$ and $\phi 3$ and the junction 5 between the phase windings $\phi 4$ and $\phi 5$ are connected to the positive pole of the power source E and the junction 2 between the phase windings $\phi 1$ and $\phi 2$ and the junction 4 between the phase windings $\phi 3$ and $\phi 4$ are connected to the negative pole of the power source E. Accordingly, currents flow in the directions shown by arrows of FIG. 2(a) to be in a five-phase excitation state. At this state, the transistors $T_1$ and $T_6$ connected to the junction 1 are both off and the junction 1 is not connected to the power source but is effectively open or disconnected from the power source.

Figure 2B:
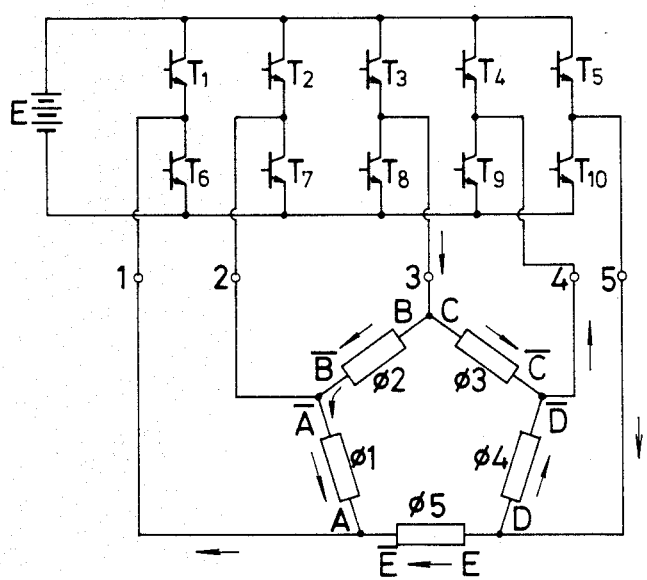

Next, during step 2, the transistors $T_3$, $T_5$, $T_7$ and $T_9$ are conductive so that the junction 3 between the phase windings $\phi 2$ and $\phi 3$ and the junction 5 between the phase windings $\phi 4$ and $\phi 5$ are connected to the positive pole of the power source E and the junction 1 between the phase windings $\phi 1$ and $\phi 5$ and the junction 4 between the phase windings $\phi 3$ and $\phi 4$ are connected to the negative pole of the power source E. Accordingly, currents flow in the directions shown by arrows of FIG. 2(b) to be in a five-phase excitation state. At this state, the transistors $T_2$ and $T_7$ are both off and the junction 2 is open or isolated from the power source E.

Figure 2C:
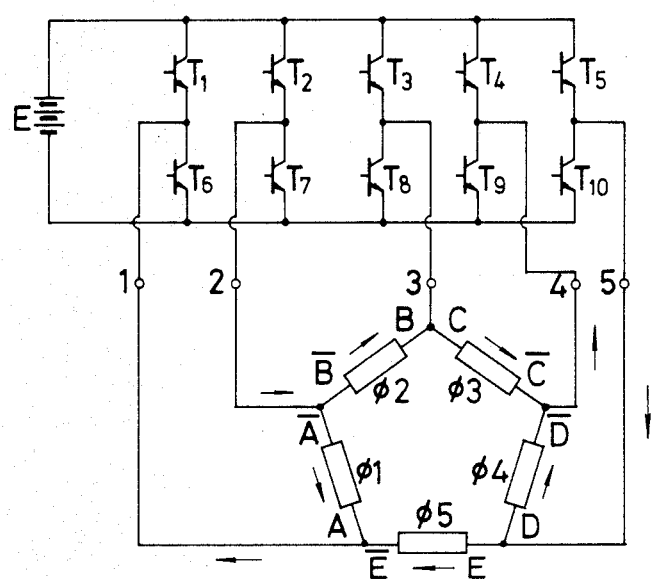

Further, during step 3, the transistors $T_2$, $T_5$, $T_6$ and $T_9$ are conductive so that the junction 2 between the phase windings $\phi 1$ and $\phi 2$ and the junction 5 between the phase windings $\phi 4$ and $\phi 5$ are connected to the positive pole of the power source E and the junction 1 between the phase windings $\phi 1$ and $\phi 5$ and the junction 4 between the phase windings $\phi 3$ and $\phi 4$ are connected to the negative pole of the power source E. Accordingly, currents flow in the directions shown by arrows in FIG. 2(c) to be in the five-phase excitation state. At this state, the transistors $T_3$ and $T_8$ connected to the junction 3 are both off and the junction 3 is in the opened state or disconnected from the power source E.

Next, during step 4, the transistors $T_2$, $T_5$, $T_6$ and $T_8$ are conductive so that the junction 2 between the phase windings $\phi 1$ and $\phi 2$ and the junction 5 between the phase windings $\phi 4$ and $\phi 5$ are connected to the positive pole of the power source E and the junction 1 between the phase windings $\phi 2$ and $\phi 3$ are connected to the negative pole of the power source E. The transistors $T_4$ and $T_9$ are off. At this state, the junction 4 is in the opened state or disconnected from the power source E by the off transistors $T_4$ and $T_9$.

Further, during step 5, the transistors $T_2$, $T_4$, $T_6$ and $T_8$ are conductive so that the junction 2 between the phase windings $\phi 1$ and $\phi 2$ and the junction 4 between the phase windings $\phi 3$ and $\phi 4$ are connected to the positive pole of the power source E and the junction 1 between the phase windings $\phi 1$ and $\phi 5$ and the junction 3 between the phase windings $\phi 2$ and $\phi 3$ are connected to the negative pole of the power source E. The transistors $T_5$ and $T_{10}$ are off. At this state, the junction 5 is open or disconnected from the power source E by the transistors $T_5$ and $T_{10}$.

During step 6, the transistors $T_2$, $T_4$, $T_8$ and $T_{10}$ are conductive and the junction 1 is open or disconnected from the power source E by the transistor $T_1$ and $T_6$.

During step 7, the transistors $T_1$, $T_4$, $T_8$ and $T_{10}$ are conductive and the junction 2 is open or disconnected from the power source E by the transistor $T_2$ and $T_7$.

During step 8, the transistors $T_1$, $T_4$, $T_7$ and $T_{10}$ are conductive and the junction 3 is open or disconnected from the power source E by the transistor $T_3$ and $T_8$.

During step 9, the transistors $T_1$, $T_3$, $T_7$ and $T_{10}$ are conductive and the junction 4 is open or disconnected from the power source E by the transistor $T_4$ and $T_9$.

During step 10, the transistors $T_1$, $T_3$, $T_7$ and $T_9$ are conductive and the junction 5 is open or disconnected from the power source E by the transistor $T_5$ and $T_{10}$.

Figure 3:
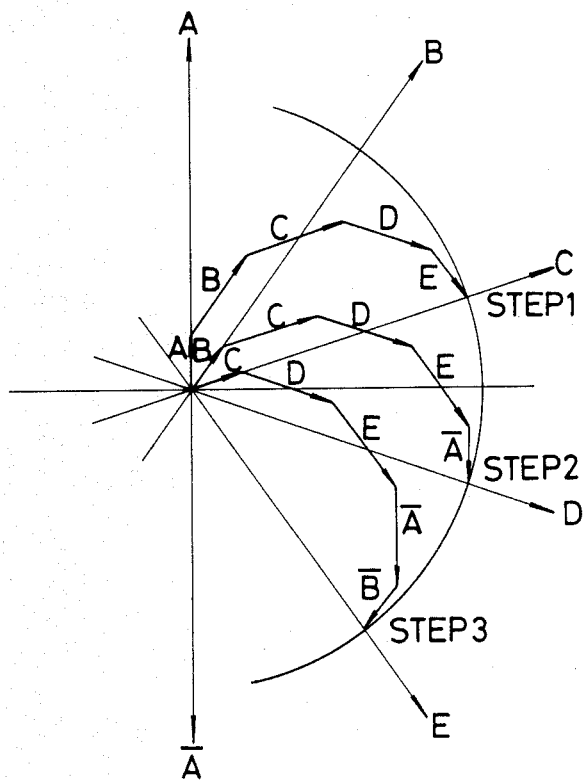
FIG. 3 is a vector diagram showing torque produced in each step.
Figure 4A:
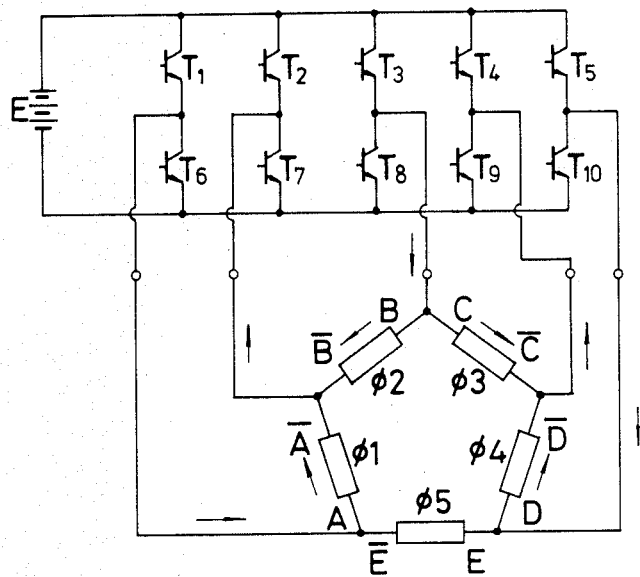
FIGS. 4(a) and 4(b) are circuit diagrams showing operation for each step using a stepping motor according to the prior art.
Figure 4B:
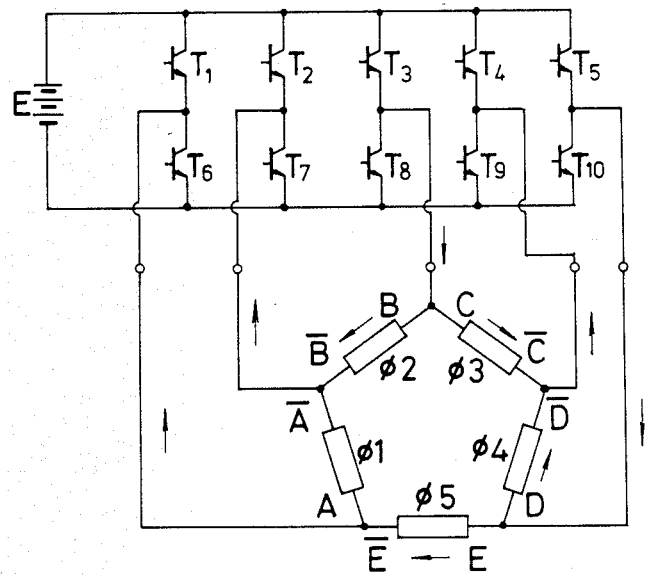

FIG. 3 is a vector diagram showing torque produced in each step. As can be seen from FIG. 3 the composite vector is rotated 36° every full step.

What is claimed is:

1. A method of driving a five-phase stepping motor having phase windings connected in series with each other to form a ring and junctions between the phase windings connected to connections between pairs of switching means, wherein one of the pair of switching means is connected to a positive pole of a d.c. power source and the other of the pair of switching means to a negative pole of the power source, comprising the steps of:

connecting two of said junctions to the positive pole of the power source with respective ones of said switching means, connecting two others of said junctions to the negative pole of the power source with respective others of said switching means, setting both switching means of remaining pairs to an off condition so that the junctions of said pairs are disconnected from the source, and switching the switching means in said pairs so that the disconnected junctions of one pair shifts to other junctions in response to every pulse and so as to energize all phase windings before and after the switching of said switching means.

2. A method of driving a five-phase stepping motor according to claim 1, wherein the phase windings of the five-phase stepping motor are $\phi 1$ to $\phi 5$, and a terminating end of the phase winding $\phi 1$ and a terminating end of the phase winding $\phi 2$, a starting end of the phase winding $\phi 2$ and a starting end of the phase winding $\phi 3$, a terminating end of the phase winding $\phi 3$ and a terminating end of the phase winding $\phi 4$, a starting end of the phase winding $\phi 4$ and a starting end of the phase winding $\phi 5$, and a terminating end of the phase winding $\phi 5$ and a starting end of the phase winding $\phi 1$ are connected to each other, respectively, a junction 1 between the phase windings $\phi 5$ and $\phi 1$ being connected to a connection a1 between switching means $T_1$ and $T_6$ connected in series to each other, a junction 2 between the phase windings $\phi 1$ and $\phi 2$ being connected to a connection a2 between switching means $T_2$ and $T_7$ connected in series to each other, a junction 3 between the phase windings $\phi 2$ and $\phi 3$ being connected to a connection a3 between switching means $T_3$ and $T_8$ connected in series to each other, a junction 4 between the phase windings $\phi 3$ and $\phi 4$ being connected to a connection a4 between switching means $T_4$ and $T_9$ connected in series to each other, a junction 5 between the phase windings $\phi 4$ and $\phi 5$ being connected to a connection a5 between switching means $T_5$ and $T_{10}$ connected in series to each other, the switching means $T_1$ to $T_5$ being connected to the positive pole of the power source, the switching means $T_6$ to $T_{10}$ being connected to the negative pole of the power source, the switching means $T_3$, $T_5$, $T_7$ and $T_9$ being operated in step 1, the switching means $T_3$, $T_5$, $T_6$ and $T_9$ being operated in step 2, the switching means $T_2$, $T_5$, $T_6$ and $T_9$ being operated in step 3, the switching means $T_2$, $T_5$, $T_6$ and $T_8$ being operated in step 4, the switching means $T_2$, $T_4$, $T_6$ and $T_8$ being operated in step 5, the switching means $T_2$, $T_5$, $T_8$ and $T_{10}$ being operated in step 6, the switching means $T_1$, $T_4$, $T_8$ and $T_{10}$ being operated in step 7, the switching means $T_1$, $T_4$, $T_7$ and $T_{10}$ being operated in step 8, the switching means $T_1$, $T_3$, $T_7$ and $T_9$ being operated in step 9, the switching means $T_1$, $T_3$, $T_7$ and $T_9$ being operated in step 10 thereby exciting the phase windings such that at each step a junction is disconnected from the power source and the disconnected junction changes from step to step and such that all phase windings are energized during each step.

3. A stepping motor system, comprising:

a motor having a plurality of phase windings connected in a loop forming a plurality of junctions;

a control circuit including a plurality of pairs of switching means, said switching means in each pair being connected to each other and forming a connection point between them, said pair of switching means being arranged for connection between the poles of a power source, said switching means being arranged for turning on and off;

said points each being connected to one of said junctions;

said control circuit including means responsive to stepping pulses for turning on one of said switching means in each of a plurality of said pairs and leaving both of said switching means off in one of said pairs in response to a stepping pulse, and changing the pair in which both of said switching means are off to another pair in response to each succeeding stepping pulses while energizing all phase windings during each stepping pulse.

4. A system as in claim 3, wherein:

said phase windings are $\phi 1$, $\phi 2$, $\phi 3$, $\phi 4$, and $\phi 5$ and said junctions are 1, 2, 3, 4, and 5;

said switching means are $T_1$ to $T_{10}$ in pairs $T_1$ and $T_6$ forming point a1, $T_2$ and $T_7$ forming point a2, $T_3$ and $T_8$ forming point a3, $T_4$ and $T_9$ forming point a4, and $T_5$ and $T_{10}$ forming point a1;

said junctions 1, 2, 3, 4, and 5 being connected to respective points a1, a2, a3, a4 and a5, the stepping pulses being repetitive in the sequence step 1, step 2, ... step 10, step 1, step 2, ... , said means responsive to stepping pulses turning on the switching means $T_3$, $T_5$, $T_7$ and $T_9$ during step 1, the switching means $T_3$, $T_5$, $T_6$ and $T_9$ during step 2, the switching means $T_2$, $T_5$, $T_6$ and $T_9$ during step 3, the switching means $T_2$, $T_5$, $T_6$ and $T_8$ during step 4, the switching means $T_2$, $T_4$, $T_6$ and $T_8$ during step 5, the switching means $T_2$, $T_5$, $T_8$ and $T_{10}$ during step 6, the switching means $T_1$, $T_4$, $T_8$ and $T_{10}$ during step 7, the switching means $T_1$, $T_4$, $T_7$ and $T_{10}$ during step 8, the switching means $T_1$, $T_3$, $T_7$ and $T_9$ during step 9, the switching means $T_1$, $T_3$, $T_7$ and $T_9$ during step 10.

5. For a motor having a plurality of phase windings connected in a loop forming a plurality of junctions, a stepping motor system, comprising:

a plurality of pairs of switching means;

said switching means in each pair being connected to each other and forming a connection point between them;

said pair of switching means being arranged for connection between the poles of a power source, said switching means being arranged for turning on and off;

said points each being arranged for connection to one of said junctions;

means responsive to stepping pulses for turning on one of said switching means in each of a plurality of said pairs and leaving both of said switching means off in one of said pairs in response to a stepping pulse, and changing the pair in which both of said switching means are off to another pair in response to each succeeding stepping pulses while energizing all phase windings during each stepping pulse.

6. A system as in claim 5, wherein:

the phase windings are $\phi 1$, $\phi 2$, $\phi 3$, $\phi 4$, and $\phi 5$ and the junctions are 1, 2, 3, 4, and 5;

said switching means are $T_1$ to $T_{10}$ in pairs $T_1$ and $T_6$ forming point a1, $T_2$ and $T_7$ forming point a2, $T_3$ and $T_8$ forming point a3, $T_4$ and $T_9$ forming point a4, and $T_5$ and $T_{10}$ forming point a1;

the junction 1, 2, 3, 4, and 5 being connected to respective points a1, a2, a3, a4, and a5, the stepping pulses being repetitive in the sequence step 1, step 2, ... step 10, step 1, step 2, ... , said means responsive to stepping pulses turning on the switching means $T_3$, $T_5$, $T_7$ and $T_9$ during step 1, the switching means $T_3$, $T_5$, $T_6$ and $T_9$ during step 2, the switching means $T_2$, $T_5$, $T_6$ and $T_9$ during step 3, the switching means $T_2$, $T_5$, $T_6$ and $T_8$ during step 4, the switching means $T_2$, $T_4$, $T_6$ and $T_8$ during step 5, the switching means $T_2$, $T_5$, $T_8$ and $T_{10}$ during step 6, the switching means $T_1$, $T_4$, $T_8$ and $T_{10}$ during step 7, the switching means $T_1$, $T_4$, $T_7$ and $T_{10}$ during step 8, the switching means $T_1$, $T_3$, $T_7$ and $T_9$ during step 9, the switching means $T_1$, $T_3$, $T_7$ and $T_9$ during step 10.

* * * * *